United States Patent
Lin (10) Patent No.: US 12,068,675 B1
(45) Date of Patent: Aug. 20, 2024

(54) SMART POWER SWITCH BANK WITH MULTIPLE INPUT REMOTE SENSE

(71) Applicant: Meta Platforms Technologies, LLC, Menlo Park, CA (US)

(72) Inventor: Zhujie Lin, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/189,977

(22) Filed: Mar. 24, 2023

(51) Int. Cl.
*H02M 1/00* (2007.01)
*H02M 3/04* (2006.01)

(52) U.S. Cl.
CPC ............. *H02M 1/009* (2021.05); *H02M 3/04* (2013.01)

(58) Field of Classification Search
None
See application file for complete search history.

(56) References Cited

U.S. PATENT DOCUMENTS

| | | | |
|---|---|---|---|
| 9,705,393 B2 * | 7/2017 | Golder | H02M 1/088 |
| 10,627,839 B2 * | 4/2020 | Ho | G05F 1/56 |
| 11,146,161 B2 * | 10/2021 | Jeon | H02M 3/156 |
| 11,675,380 B2 * | 6/2023 | Searles | G05F 1/565 323/282 |

* cited by examiner

*Primary Examiner* — Jeffrey S Zweizig
(74) *Attorney, Agent, or Firm* — Greenberg Traurig, LLP (57) ABSTRACT

In one embodiment, a system includes several voltage regulators configured to output several voltage levels. Each voltage regulator may correspond to a respective voltage level. The system includes a power switch bank that includes several power switches and several multiplexors. A set of power switches are coupled to each of the voltage regulators. Each power switch is coupled to at least one of the multiplexors. Each multiplexor is coupled to a respective voltage regulator. The system includes one or more loads coupled to a respective one or more power switch.

20 Claims, 5 Drawing Sheets

SMART POWER SWITCH BANK WITH MULTIPLE INPUT REMOTE SENSE

TECHNICAL FIELD

This disclosure generally relates to power management integrated circuits.

BACKGROUND

Power management integrated circuits (PMICs) are integrated circuits for power management. Although PMIC refers to a wide range of chips (or modules in system-on-a-chip (SOC) devices), most include several DC/DC converters or their control part. A PMIC is often included in battery-operated devices such as mobile phones and portable media players to decrease the amount of space required. PMICs are a class of integrated circuits that perform various functions related to power requirements. A PMIC may perform one or more of DC to DC conversion, battery charging, power-source selection, voltage scaling, power sequencing, and other miscellaneous functions.

PMICs are solid state devices that control the flow and direction of electrical power. Many electrical devices use multiple internal voltages (e.g., 5 V, 3.3 V, 1.8 V, etc.) and sources of external power (e.g., wall outlet, battery, etc.), meaning that the power design of the device has multiple requirements for operation. A PMIC can refer to any chip that is an individual power related function.

SUMMARY OF PARTICULAR EMBODIMENTS

Disclosed herein is a computing system may include a smart power switch bank with multiple inputs and remote sensing. In electrical systems, a voltage regulator may be needed to ensure that the voltage supplied to power domains and/or loads are getting a minimum voltage that is required to operate properly. As an example and not by way of limitation, a voltage regulator may be used to provide 1V to a load (e.g., CPU logic, SRAM, DRAM, PLL) for the load to operate properly. Normally, one voltage regulator may be needed for each power domain to custom tailor the voltage to that power domain so that the respective power domain is guaranteed to get the minimum voltage that is needed dynamically. However, for systems that have many power domains, that may require many voltage regulators. That is, there may be numerous individual dynamic voltage frequency scaling (DVFS) domains (e.g., power domains), which require a proportional number of switch-mode power supplies (SMPS). There may not be enough SMPS channels to service all of the DVFS domains. Additionally, voltage regulators may be large in size. The housing for the electrical system that includes one or more voltage regulators may need to accommodate the size of each of the voltage regulators. However, some computing systems (e.g., smartphone, mixed reality (MR) device, etc.) may not have the space to dedicate a large number of voltage regulators to match the number of power domains of the system. As such, smaller devices may have limited space for voltage regulators and less available power domains as a result. To counteract the limited space for voltage regulators, there may be groups of loads or power domains requiring the same voltage levels that share access to common power rails, which may be serviced by a voltage regulator. However, in order to guarantee that the power domains are getting the voltage required (e.g., depending on circuit components and/or temperature, the voltage received may be less than what the voltage regulator is outputting), the voltage regulator may need to monitor the voltage of the power domains that the voltage regulator is servicing dynamically.

In particular embodiments, a smart power switch bank (or simply power switch bank) may be implemented in a computing system (e.g., smartphone, MR device, etc.) to provide power domains access to various discrete voltages without the need to have an individual voltage regulator for each power domain. Instead, to enable a voltage regulator to monitor what voltages power domains are receiving, a feedback loop may be used back to the voltage regulator. However, instead of routing too many remote sense signals to the voltage regulators, a multiplexor (MUX) may be used to pick the lowest voltage from the power domains sharing a particular voltage regulator that is supplying a specific voltage (e.g., 1 V) to one or more power switches. The lowest voltage that is sent back to the voltage regulator may inform the voltage regulator whether the power domains or loads are receiving enough voltage. If the power domains are not receiving enough voltage, then the voltage regulator may raise the voltage to ensure that each power domain being serviced gets the minimum amount of voltage. In particular embodiments, the MUX may inform whether each power domain is active, such that signals from inactive domains may be ignored. The MUX may be configured to send the lowest voltage of active domains. The power domains may be grouped by rail voltages and power switches. The number of voltage regulators needed may be reduced when grouping the power domains. That is, in particular embodiments, when manufacturing a SOC to include the smart power switch bank and the necessary voltage regulators, the number of voltage regulators needed may be reduced by grouping the power domains together on a rail.

In particular embodiments, the smart power switch bank may be implemented using a simple printed circuit board (PCB) routing, which may use as many nets as the number of discrete voltages. By having fewer rails, the computing system may be able to remote sense each of the rails, which would enable a more accurate point of load regulation. The computing system may also realize potential power savings using the smart power switch bank as well. The implementation of the smart power switch bank in a system may provide 1:1 matching between the number of power switch outputs and DVFS domains, which may lead to a maximum SOC efficiency and lowest leakage design. The implementation of the smart power switch bank may be simple to design as there is a single power switch block that may be repeated N times (the number of power domains multiplied by the number of discrete voltages for each power domain). There may be lower risk from the PMIC as a result of having fewer PMICs. The smaller and/or more efficient PMIC design may lead to fewer rails and fewer components, which may be result in space savings on the computing system. The space savings may be used on more efficient inductors or more die area/A for power switches. The smart power switch bank may use small package level capacitors for power switch output for further noise elimination.

In some embodiments, the smart power switch bank may have knobs or a component that may dynamically change the voltage output of the voltage regulators. The knobs or components that may dynamically change the voltage of the power domain by selecting the power switch connected to the power rail with the desired nominal voltage may be included and/or located in the power switch bank. In particular embodiments, the knobs or components may receive an input (e.g., a user turning the knob) to dynamically change the voltage of the power domain. The smart power switch bank may have multiple input remote sensing by using analog MUXs that transmit the lowest voltage among active inputs. The smart power switch bank may overcome power switch IR drop differences by using the multiple input remote sensing. The multiple input remote sensing may provide smooth analog transitions. The power switch sizing may be optimized according to the expected load current to maintain a relatively constant drop across all of the power switches. In particular embodiments, the power switches may vary based on expected load. As an example and not by way of limitation, prior to manufacturing, a design of the components of the smart power switch bank may be chosen based on the expected loads and estimated power domains that are coupled to the smart power switch bank. The size of the various components of the smart power switch bank, such as the power switches, may be chosen based on the expected loads and/or power domains that will be coupled to the smart power switch bank.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a computing system may include a smart power switch bank with multiple inputs and remote sensing. In electrical systems, a voltage regulator may be needed to ensure that the voltage supplied to power domains and/or loads are getting a minimum voltage that is required to operate properly. As an example and not by way of limitation, a voltage regulator may be used to provide 1V to a load (e.g., CPU logic, SRAM, DRAM, PLL) for the load to operate properly. Normally, one voltage regulator may be needed for each power domain to custom tailor the voltage to that power domain so that the respective power domain is guaranteed to get the minimum voltage that is needed dynamically. However, for systems that have many power domains, that may require many voltage regulators. That is, there may be numerous individual dynamic voltage frequency scaling (DVFS) domains (e.g., power domains), which require a proportional number of switch-mode power supplies (SMPS). There may not be enough SMPS channels to service all of the DVFS domains. Additionally, voltage regulators may be large in size. The housing for the electrical system that includes one or more voltage regulators may need to accommodate the size of each of the voltage regulators. However, some computing systems (e.g., smartphone, mixed reality (MR) device, etc.) may not have the space to dedicate a large number of voltage regulators to match the number of power domains of the system. As such, smaller devices may have limited space for voltage regulators and less available power domains as a result. To counteract the limited space for voltage regulators, there may be groups of loads or power domains requiring the same voltage levels that share access to common power rails, which may be serviced by a voltage regulator. However, in order to guarantee that the power domains are getting the voltage required (e.g., depending on circuit components and/or temperature, the voltage received may be less than what the voltage regulator is outputting), the voltage regulator may need to monitor the voltage of the power domains that the voltage regulator is servicing dynamically.

In particular embodiments, a smart power switch bank (or simply power switch bank) may be implemented in a computing system (e.g., smartphone, MR device, etc.) to provide power domains access to various discrete voltages without the need to have an individual voltage regulator for each power domain. Instead, to enable a voltage regulator to monitor what voltages power domains are receiving, a feedback loop may be used back to the voltage regulator. However, instead of routing too many remote sense signals to the voltage regulators, a multiplexor (MUX) may be used to pick the lowest voltage from the power domains sharing a particular voltage regulator that is supplying a specific voltage (e.g., 1 V) to one or more power switches. The lowest voltage that is sent back to the voltage regulator may inform the voltage regulator whether the power domains or loads are receiving enough voltage. If the power domains are not receiving enough voltage, then the voltage regulator may raise the voltage to ensure that each power domain being serviced gets the minimum amount of voltage. In particular embodiments, the MUX may inform whether each power domain is active, such that signals from inactive domains may be ignored. The MUX may be configured to send the lowest voltage of active domains. The power domains may be grouped by rail voltages and power switches. The number of voltage regulators needed may be reduced when grouping the power domains. That is, in particular embodiments, when manufacturing a SOC to include the smart power switch bank and the necessary voltage regulators, the number of voltage regulators needed may be reduced by grouping the power domains together on a rail.

In particular embodiments, the smart power switch bank may be implemented using a simple printed circuit board (PCB) routing, which may use as many nets as the number of discrete voltages. By having fewer rails, the computing system may be able to remote sense each of the rails, which would enable a more accurate point of load regulation. The computing system may also realize potential power savings using the smart power switch bank as well. The implementation of the smart power switch bank in a system may provide 1:1 matching between the number of power switch outputs and DVFS domains, which may lead to a maximum SOC efficiency and lowest leakage design. The implementation of the smart power switch bank may be simple to design as there is a single power switch block that may be repeated N times (the number of power domains multiplied by the number of discrete voltages for each power domain). There may be lower risk from the PMIC as a result of having fewer PMICs. The smaller and/or more efficient PMIC design may lead to fewer rails and fewer components, which may be result in space savings on the computing system. The space savings may be used on more efficient inductors or more die area/A for power switches. The smart power switch bank may use small package level capacitors for power switch output for further noise elimination.

In some embodiments, the smart power switch bank may have knobs or a component that may dynamically change the voltage output of the voltage regulators. The knobs or components that may dynamically change the voltage of the power domain by selecting the power switch connected to the power rail with the desired nominal voltage may be included and/or located in the power switch bank. In particular embodiments, the knobs or components may receive an input (e.g., a user turning the knob) to dynamically change the voltage of the power domain. The smart power switch bank may have multiple input remote sensing by using analog MUXs that transmit the lowest voltage among active inputs. The smart power switch bank may overcome power switch IR drop differences by using the multiple input remote sensing. The multiple input remote sensing may provide smooth analog transitions. The power switch sizing may be optimized according to the expected load current to maintain a relatively constant drop across all of the power switches. In particular embodiments, the power switches may vary based on expected load. As an example and not by way of limitation, prior to manufacturing, a design of the components of the smart power switch bank may be chosen based on the expected loads and estimated power domains that are coupled to the smart power switch bank. The size of the various components of the smart power switch bank, such as the power switches, may be chosen based on the expected loads and/or power domains that will be coupled to the smart power switch bank.

In particular embodiments, a system may be embodied as one or more of a computing system as described herein. The system may be embodied as one or more of a smartphone, MR device, etc. In particular embodiments, the system may comprise a plurality of voltage regulators that are configured to output a plurality of voltage levels. In particular embodiments, the plurality of voltage regulators may adjust one or more voltage levels of the plurality of voltage levels. In particular embodiments, the plurality of voltage regulators may include a first voltage regulator and a second voltage regulator, where the first voltage regulator may output a first output voltage level (e.g., 1V) and the second voltage regulator may output a second output voltage level (e.g., 3V). The first output voltage level or the second output voltage level may be adjusted by the respective voltage regulator. In particular embodiments, the system may comprise a knob or a component that may be used to adjust the output voltage level of the respective voltage regulator. As an example and not by way of limitation, a user may select among the available voltage levels by selecting the load switch connected to the power rail which provides the desired nominal voltage. As another example and not by way of limitation, a user may turn a knob to adjust the output voltage level. As another example and not by way of limitation, the system may identify one or more loads and their respective minimum voltage levels to operate and adjust the output voltage levels of one or more voltage regulators to satisfy the minimum voltage levels. Although the disclosure contemplates one or more voltage regulators in a particular manner, this disclosure contemplates one or more voltage regulators in any suitable manner.

In particular embodiments, the system may comprise a power switch bank. The power switch bank may be a smart power switch bank. In particular embodiments, the power switch bank may comprise one or more of a plurality of power switches and a plurality of multiplexors. In particular embodiments, a set of power switches of the plurality of power switches may be coupled to each of the plurality of voltage regulators. As an example and not by way of limitation, if the system has two voltage regulators and the set of power switches comprises three power switches, the set of power switches would at least be coupled to both of the two voltage regulators (e.g., one power switch on a first voltage regulator and two power switches on a second voltage regulator, etc.). In particular embodiments, each of the plurality of power switches is coupled to at least one of the plurality of multiplexors. As an example and not by way of limitation, if there are two multiplexors, the power switches may be coupled to one or both of the multiplexors based on whether there are one or more power switches on a rail voltage. In particular embodiments, each of the plurality of multiplexors may be coupled to a respective voltage regulator of the plurality of voltage regulators. In particular embodiments, each of the plurality of power switches may be coupled to one voltage regulator of the plurality of voltage regulators. The multiplexor the corresponding power switch may be connected to may be the one voltage regulator that the power switch is coupled to form a feedback loop. If there are two or more power switches on a rail voltage, then the power switches may be connected to the corresponding multiplexors that are coupled to the respective voltage regulators to form feedback loops. In particular embodiments, the power switch bank may be ideal diodes that can transition between voltages smoothly. In particular embodiments, the power switch bank may be coupled after interposer pins. In particular embodiments, the power switch bank may be placed on the same deck as the SOC. In particular embodiments, the design of the power switch bank may be focused on minimizing any voltage sag during transitions. In particular embodiments, the size of each of the plurality of power switches may be based on the one or more loads coupled to the respective power switch. Although the disclosure contemplates a power switch bank in a particular manner, this disclosure contemplates a power switch bank in any suitable manner.

In particular embodiments, the system may comprise one or more loads that are coupled to a respective one or more power switches of the plurality of power switches. As an example and not by way of limitation, if the system comprises two loads, each of the loads may be coupled to a power switch or a set of power switches on a rail voltage. In particular embodiments, one or more loads may be grouped together to be coupled to one rail voltage. A rail voltage may be associated with a set of power switches. In particular embodiments, while the disclosure describes the system as comprising one or more loads, this disclosure contemplates the system comprising one or more power domains or one or more individual DVFS domains instead of loads. In particular embodiments, a load may be a system of component of a system that consumes power. In particular embodiments, a power domain may be a function within an SOC. In particular embodiments, a DVFS domain may be a power domain that requires a dynamically changing voltage. Although the disclosure contemplates one or more loads in a particular manner, this disclosure contemplates one or more loads in any suitable manner.

In particular embodiments, the system may comprise multiple sets of power switches that are each coupled to a plurality of respective voltage regulators. As an example and not by way of limitation, if the system comprises three voltage regulators (each with a discrete output voltage) and two sets of power switches (e.g., one set including two power switches and another set including three power switches), then one set of power switches may be connected to each of the three voltage regulators on one rail voltage and the other set of power switches may be connected to two of the three voltage regulators on another rail voltage. In particular embodiments, the set of power switches may be further configured to receive each of the plurality of voltage levels from the plurality of voltage regulators. In particular embodiments, the output of each voltage regulator may correspond to each power switch of the set of power switches. In particular embodiments, the set of power switches is configured to output a combination of the plurality of voltage levels to the one or more loads based on the one or more loads coupled to the set of power switches. As an example and not by way of limitation, if a first voltage regulator is outputting 1V and a second voltage regulator is outputting 2V, then a set of power switches coupled to both voltage regulators in a rail voltage may output 3V for the load coupled to the rail voltage. Although the disclosure contemplates one or more power switches in a particular manner, this disclosure contemplates one or more power switches in any suitable manner.

In particular embodiments, each of the plurality of multiplexors may receive a first signal and a second signal from each of the plurality of power switches coupled to the respective multiplexor. In particular embodiments, the first signal may be indicative of whether the respective power switch is active. As an example and not by way of limitation, if the load coupled to a power switch is inactive, then the power switch may be inactive. In particular embodiments, the second signal may be indicative of a corresponding voltage level associated with the respective power switch. As an example and not by way of limitation, the power switch may send a signal to the multiplexor that indicates the corresponding voltage level of the power switch, which may correspond to the voltage regulator the power switch is connected/coupled. In particular embodiments, the multiplexor may be an analog multiplexor. Although the disclosure contemplates one or more multiplexors in a particular manner, this disclosure contemplates one or more multiplexors in any suitable manner.

In particular embodiments, the system may be configured to perform multiple input remote sensing. In particular embodiments, each of the plurality of multiplexors may be configured to determine a lowest voltage level corresponding to the plurality of power switches coupled to the respective multiplexor. As an example and not by way of limitation, if a plurality of power switches are connected to a first multiplexor, the first multiplexor may determine and output a lowest voltage level signal to the voltage regulator that the first multiplexor is coupled. The lowest voltage level signal may be indicative of the lowest voltage level of the active power switches that are connected to the first multiplexor. In particular embodiments, each of the plurality of voltage regulators may be configured to adjust one or more voltage levels of the plurality of voltage levels based on the lowest voltage level signal received from the respective multiplexor. The plurality of voltage regulators may be configured to adjust one of the plurality of voltage levels higher if the lowest voltage level is below a threshold voltage level. In particular embodiments, the threshold voltage level is based on the one or more loads. As an example and not by way of limitation, the load may specify it needs a minimum voltage of 1V to operate. However, if a multiplexor coupled to the loop including the power switch and the voltage regulator associated with the load receives a lowest voltage level signal indicative of 0.9V, the multiplexor may send the voltage level signal of 0.9V to the voltage regulator. The voltage regulator may adjust the output voltage to all power switches coupled to the voltage regulator by 0.1V to compensate and ensure the load reaches the minimum voltage required to operate. All the other power switches may be coupled to loads or power domains that may be adjusted 0.1V higher. As an example and not by way of limitation, for a power switch that had a previous output voltage of 1V, the new output voltage may be 1.1V. In particular embodiments, the one or more loads may comprise one or more of a dynamic voltage frequency scaling domain or a rail gate (rail voltage). In particular embodiments, the multiple input remote sensing may overcome high current through limited interposer routes. In particular embodiments, current in grouped rails may have high dynamic range and is overall higher power than individual voltage regulators. In particular embodiments, PCB decoupling capacitors may be used for multiple input remote sensing. In particular embodiments, there may be as many inputs into the multiple input remote sensing as there are rails to monitor. Although the disclosure contemplates multiple input remote sensing in a particular manner, this disclosure contemplates multiple input remote sensing in any suitable manner.

In particular embodiments, the system may comprise one or more bulk decoupling capacitors between the plurality of voltage regulators and the power switch bank. As an example and not by way of limitation, the output voltage from the voltage regulators may need to pass through the one or more bulk decoupling capacitors prior to connecting to the plurality of power switches. In particular embodiments, there may be one bulk decoupling capacitor and one high frequency capacitor for each major rail. In particular embodiments, multiple rails may be Kelvined. In particular embodiments, the system may comprise one or more small decoupling capacitors coupled between the power switch bank and the one or more loads. As an example and not by way of limitation, the output of a rail (e.g., a power switch) may need to pass through the one or more small decoupling capacitors to the respective load. In particular embodiments, the small decoupling capacitors may be inside the SOC or on the PCB. The small decoupling capacitors may include one or more high frequency decoupling capacitors. In particular embodiments, the small decoupling capacitors be configured to transition the system from one voltage to another voltage without droop. Although the disclosure contemplates one or more decoupling capacitors in a particular manner, this disclosure contemplates one or more decoupling capacitors in any suitable manner.

Figure 1:
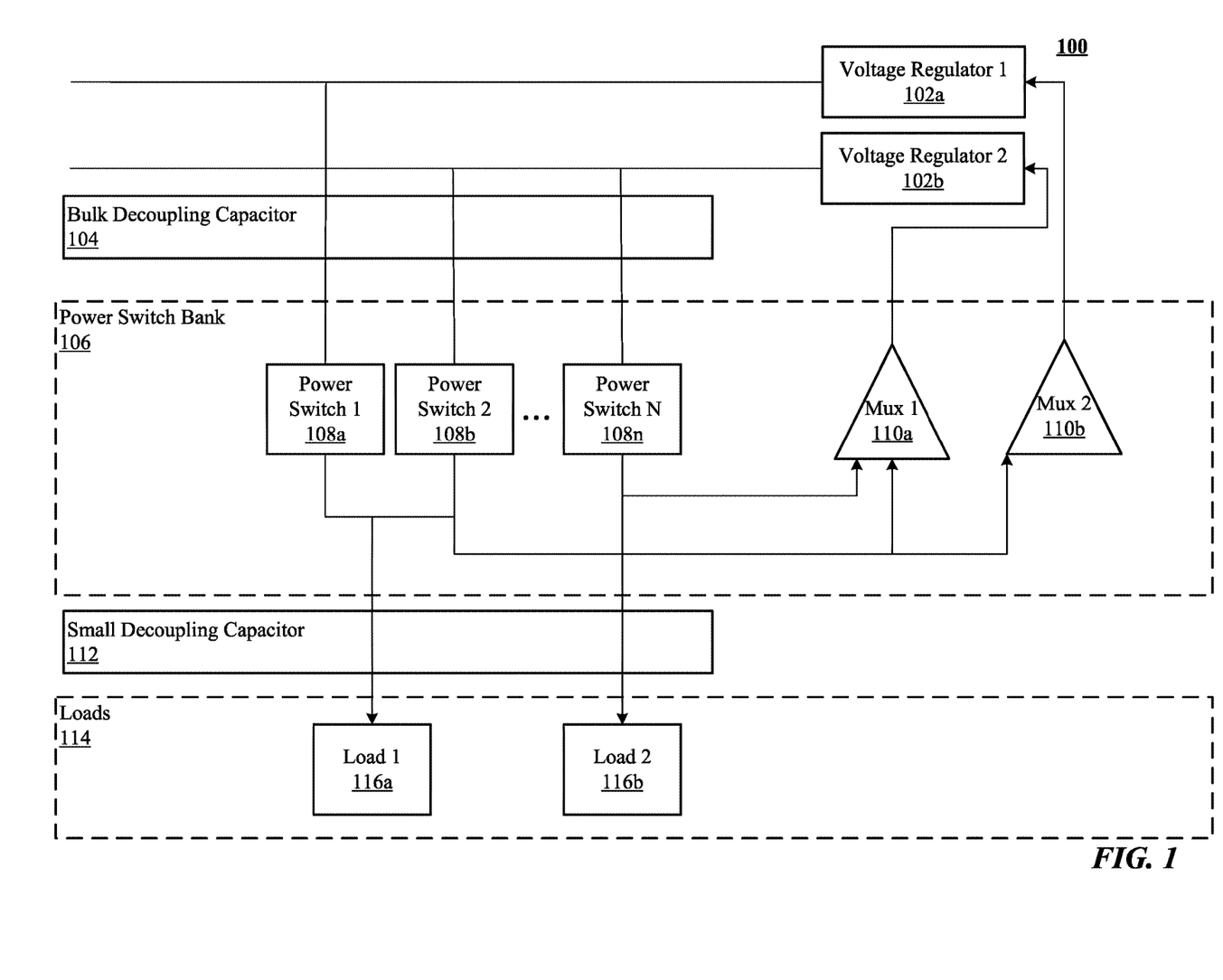
FIG. 1 illustrates an example environment associated with a computing system.

Referring to FIG. 1, an example environment 100 associated with a computing system is shown. In particular embodiments, the computing system may be embodied as a smartphone, MR device, etc. In particular embodiments, one or more components of the environment 100 may be embodied as part of a SOC that is used within a computing system.

In particular embodiments, one or more components of the environment 100 may be embodied as a PCB used within a computing system. In particular embodiments, the environment 100 may include a voltage regulator 1 102a, voltage regulator 2 102b, a bulk decoupling capacitor 104, a power switch bank 106, small decoupling capacitor 112, and loads 114. In particular embodiments, the power switch bank 106 may comprise one or more of power switches 1-N 108a-108n, MUX 1 110a, and MUX 2 110b. In particular embodiments, the voltage regulators 102 may output a voltage level. The voltage regulator 1 102a may output a first voltage level that is different from a second voltage level output from the voltage regulator 2 102b. As an example and not by way of limitation, the first voltage level from voltage regulator 1 102a may be 3V and the second voltage level from voltage regulator 2 102b may be 1V. In particular embodiments, each of the one or more power switches 108 may be coupled to one of the voltage regulators 102 through the bulk decoupling capacitor 104. As an example and not by way of limitation, power switch 1 108a coupled to voltage regulator 1 102a may be supplied 3V from voltage regulator 1 102a. As another example and not by way of limitation, power switch 2 108b coupled to voltage regulator 2 102b may be supplied 1V from voltage regulator 2 102b. As another example and not by way of limitation, the power switch N 108n may be coupled to voltage regulator 2 102b and supplied 1V from voltage regulator 2 102b. In particular embodiments, the output of both power switch 1 108a and power switch 2 108b may be coupled to load 1 116a to provide 4V from the rail voltage including both power switch 1 108a and power switch 2 108b through the small decoupling capacitor 112. In particular embodiments, the output from power switch N 108n may be coupled to load 2 116b to provide 1 V from the rail voltage including power switch N 108n through the small decoupling capacitor 112.

In particular embodiments, the power switches 108 may output signals to the MUXs 110 as described herein. As an example and not by way of limitation, power switch 1 108a and power switch 2 108b may output signals to both MUX 1 110a and MUX 2 110b. In particular embodiments, the power switch 108 may output signals to the MUX 110 that corresponds to the voltage regulator 102 that creates a feedback loop. As an example and not by way of limitation, the power switch 1 108a may be coupled to both voltage regulator 1 102a and MUX 2 110b that is coupled to the voltage regulator 1 102a. As another example and not by way of limitation, the power switch 2 108b and the power switch N 108n may be coupled to MUX 1 110a that is coupled to the voltage regulator 2 102b. In particular embodiments, the power switches 108 may each output a first signal and a second signal, where the first signal indicates whether the power switch 108 is active and the second signal indicates the voltage level of the power switch 108. The MUXs 110 receive all of the input signals from the respective power switches 108 that form the feedback loop with the respective voltage regulator 102 and determines the lowest voltage level from the connected power switches 108. The MUX 110 may then send a lowest voltage level signal indicative of the lowest voltage level to the respective voltage regulators 102. The voltage regulators 102 may determine whether to dynamically adjust the voltage levels output to the power switches 108 based on whether the lowest voltage level falls below a threshold voltage level. The threshold voltage level may be determined based on the loads 116 coupled to the respective power switches 108 that are coupled to the MUX 110. As an example and not by way of limitation, if the minimum operating voltage for load 1 116a is 3V and the minimum operating voltage for load 2 116b is 1V, then the threshold voltage level for voltage regulator 2 102 may be 1V. As such, each voltage regulator 102 may have different threshold voltage levels. The voltage regulators 102 may adjust the output voltage in response to determining that the lowest voltage level falls below the threshold voltage level. In particular embodiments, the loads 116 may be embodied as one or more of a rail voltage or a DVFS domain. Although the disclosure illustrate the environment 100 with a specific number of components in a particular arrangement, this disclosure contemplates the environment may include any number of components in any particular arrangement. As an example and not by way of limitation, the environment 100 may include four voltage regulators 102 or ten power switches 108. In particular embodiments, the number of MUXs 110 may correspond to the number of voltage regulators 102. As an example and not by way of limitation, if there are four voltage regulators 102, then there are four MUXs 110 corresponding to the four voltage regulators 102 to provide a feedback loop and perform multiple input remote sensing. In particular embodiments, the components of the environment 100 may be connected via one or more wires between the components.

Figure 2:
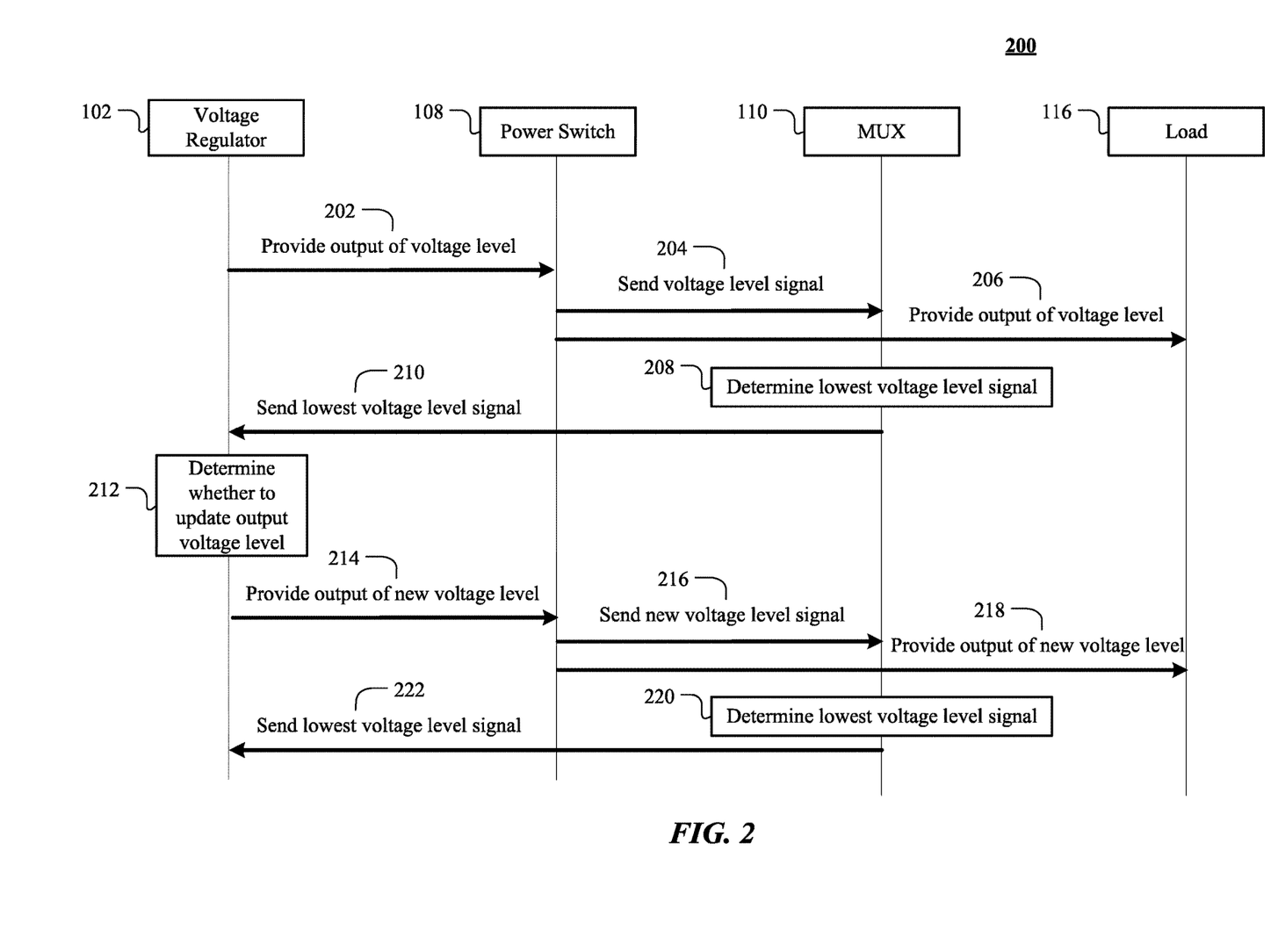
FIG. 2 illustrates another example flow diagram of a process of voltage scaling.

Referring to FIG. 2, an example flow diagram of a process 200 of voltage scaling is shown. Although the disclosure illustrates the process 200 with a certain number of components arranged in a particular arrangement, this disclosure contemplates the process 200 including any number of components in any suitable arrangement, where the other components may also be performing similar functions as described herein. As an example and not by way of limitation, there may be two power switches 108 instead of only one power switch 108. As another example and not by way of limitation, there may be a bulk decoupling capacitor 104 that the output of voltage regulator 102 needs to pass to output to the power switch 108. In particular embodiments, the process 200 starts with the voltage regulator 102 providing an output voltage level to the power switch 108 at step 202. At step 204, the power switch 108 may send the voltage level signal to the MUX 110. The voltage level signal may indicate the voltage level of the output voltage level and may indicate whether the power switch 108 is active. At step 206, the power switch 108 may provide the output of voltage level to the load 116. At step 208, the MUX 110 may determine the lowest voltage level signal based on the received voltage level signals from each power switch 108 coupled to the MUX 110. At step 210, the MUX 110 may send the lowest voltage level signal to the voltage regulator 102. The voltage regulator 102 may determine whether to update the output voltage level at step 212. Step 212 may be performed by the voltage regulator by accessing a threshold voltage level that the voltage regulator 102 is required to meet. As an example and not by way of limitation, if the load 116 specified that the load 116 requires a minimum voltage of 1V, then the voltage regulator may set the threshold voltage level to 1V. If the voltage regulator 102 determines not to update the output voltage level, then the process 200 may stop at step 212. However, if the voltage regulator 102 determines to update the output voltage level because the lowest voltage level signal falls below the threshold voltage level, then the voltage regulator 102 provides output of new voltage level to the power switch 108 at step 214. At step 216, the power switch 108 may again send the new voltage level signal to the MUX 110. At step 218, the power switch 108 may provide the output of the new voltage level to the load 116. At step 220, the MUX 110 may repeat the feedback process of determining the lowest voltage level signal. At step 222, the MUX 110 may send the lowest voltage level signal to the voltage regulator 102.

Figure 3:
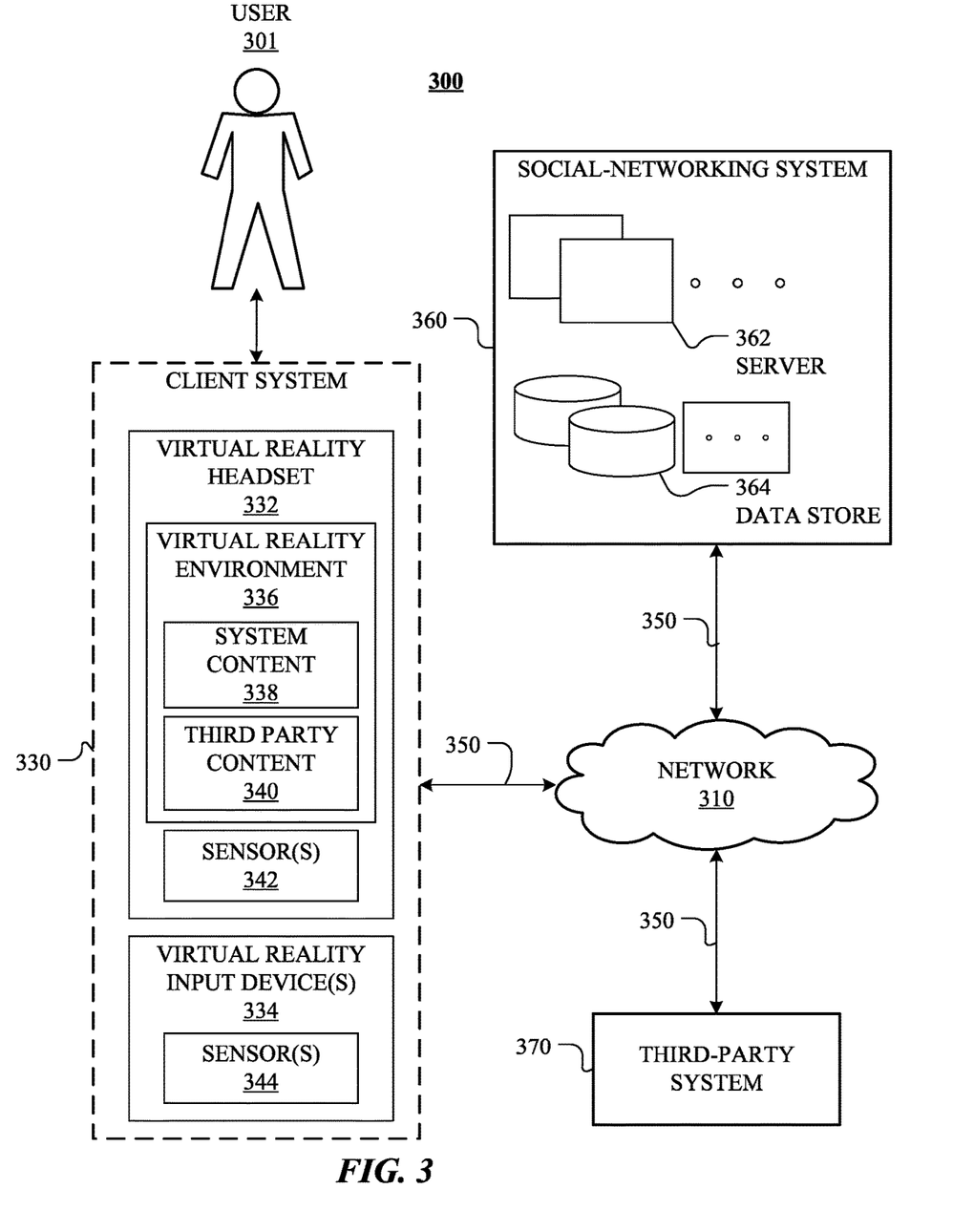
FIG. 3 illustrates an example network environment associated with a virtual reality system.

FIG. 3 illustrates an example network environment 300 associated with a virtual reality system. Although a virtual reality system is shown, the client system 330 may be embodied as a mixed reality system or augmented reality system. In particular embodiments, one or more components of the network environment 300 may include a smart power switch bank and/or one or more components of the environment 100 as described herein. As an example and not by way of limitation, the client system 330 may include an SOC including the one or more components of environment 100. Network environment 300 includes a user 301 interacting with a client system 330, a social-networking system 360, and a third-party system 370 connected to each other by a network 310. Although FIG. 3 illustrates a particular arrangement of a user 301, a client system 330, a social-networking system 360, a third-party system 370, and a network 310, this disclosure contemplates any suitable arrangement of a user 301, a client system 330, a social-networking system 360, a third-party system 370, and a network 310. As an example and not by way of limitation, two or more of a user 301, a client system 330, a social-networking system 360, and a third-party system 370 may be connected to each other directly, bypassing a network 310. As another example, two or more of a client system 330, a social-networking system 360, and a third-party system 370 may be physically or logically co-located with each other in whole or in part. Moreover, although FIG. 3 illustrates a particular number of users 301, client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple users 301, client systems 330, social-networking systems 360, third-party systems 370, and networks 310.

This disclosure contemplates any suitable network 310. As an example and not by way of limitation, one or more portions of a network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 310 may include one or more networks 310.

Links 350 may connect a client system 330, a social-networking system 360, and a third-party system 370 to a communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout a network environment 300. One or more first links 350 may differ in one or more respects from one or more second links 350.

In particular embodiments, a client system 330 may be an electronic device including hardware, software, or embedded logic components or a combination of two or more such components and capable of carrying out the appropriate functionalities implemented or supported by a client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 330. A client system 330 may enable a network user at a client system 330 to access a network 310. A client system 330 may enable its user to communicate with other users at other client systems 330. A client system 330 may generate a virtual reality environment for a user to interact with content.

In particular embodiments, a client system 330 may include a virtual reality (or augmented reality) headset 332, such as OCULUS RIFT and the like, and virtual reality input device(s) 334, such as a virtual reality controller. A user at a client system 330 may wear the virtual reality headset 332 and use the virtual reality input device(s) to interact with a virtual reality environment 336 generated by the virtual reality headset 332. Although not shown, a client system 330 may also include a separate processing computer and/or any other component of a virtual reality system. A virtual reality headset 332 may generate a virtual reality environment 336, which may include system content 338 (including but not limited to the operating system), such as software or firmware updates and also include third-party content 340, such as content from applications or dynamically downloaded from the Internet (e.g., web page content). A virtual reality headset 332 may include sensor(s) 342, such as accelerometers, gyroscopes, magnetometers to generate sensor data that tracks the location of the headset device 332. The headset 332 may also include eye trackers for tracking the position of the user's eyes or their viewing directions. The client system may use data from the sensor(s) 342 to determine velocity, orientation, and gravitation forces with respect to the headset. Virtual reality input device(s) 334 may include sensor(s) 344, such as accelerometers, gyroscopes, magnetometers, and touch sensors to generate sensor data that tracks the location of the input device 334 and the positions of the user's fingers. The client system 330 may make use of outside-in tracking, in which a tracking camera (not shown) is placed external to the virtual reality headset 332 and within the line of sight of the virtual reality headset 332. In outside-in tracking, the tracking camera may track the location of the virtual reality headset 332 (e.g., by tracking one or more infrared LED markers on the virtual reality headset 332). Alternatively or additionally, the client system 330 may make use of inside-out tracking, in which a tracking camera (not shown) may be placed on or within the virtual reality headset 332 itself. In inside-out tracking, the tracking camera may capture images around it in the real world and may use the changing perspectives of the real world to determine its own position in space.

Third-party content 340 may include a web browser and may have one or more add-ons, plug-ins, or other extensions. A user at a client system 330 may enter a Uniform Resource Locator (URL) or other address directing a web browser to a particular server (such as server 362, or a server associated with a third-party system 370), and the web browser may generate a Hyper Text Transfer Protocol (HTTP) request and communicate the HTTP request to server. The server may accept the HTTP request and communicate to a client system 330 one or more Hyper Text Markup Language (HTML) files responsive to the HTTP request. The client system 330 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, combinations of markup language and scripts, and the like. Herein, reference to a web interface encompasses one or more corresponding source files (which a browser may use to render the web interface) and vice versa, where appropriate.

In particular embodiments, the social-networking system 360 may be a network-addressable computing system that can host an online social network. The social-networking system 360 may generate, store, receive, and send social-networking data, such as, for example, user-profile data, concept-profile data, social-graph information, or other suitable data related to the online social network. The social-networking system 360 may be accessed by the other components of network environment 300 either directly or via a network 310. As an example and not by way of limitation, a client system 330 may access the social-networking system 360 using a web browser of a third-party content 340, or a native application associated with the social-networking system 360 (e.g., a mobile social-networking application, a messaging application, another suitable application, or any combination thereof) either directly or via a network 310. In particular embodiments, the social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, the social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, the social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. The social-networking system 360 may provide users of the online social network the ability to communicate and interact with other users. In particular embodiments, users may join the online social network via the social-networking system 360 and then add connections (e.g., relationships) to a number of other users of the social-networking system 360 whom they want to be connected to. Herein, the term "friend" may refer to any other user of the social-networking system 360 with whom a user has formed a connection, association, or relationship via the social-networking system 360.

In particular embodiments, the social-networking system 360 may provide users with the ability to take actions on various types of items or objects, supported by the social-networking system 360. As an example and not by way of limitation, the items and objects may include groups or social networks to which users of the social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 360 or by an external system of a third-party system 370, which is separate from the social-networking system 360 and coupled to the social-networking system 360 via a network 310.

In particular embodiments, the social-networking system 360 may be capable of linking a variety of entities. As an example and not by way of limitation, the social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating the social-networking system 360. In particular embodiments, however, the social-networking system 360 and third-party systems 370 may operate in conjunction with each other to provide social-networking services to users of the social-networking system 360 or third-party systems 370. In this sense, the social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 360 also includes user-generated content objects, which may enhance a user's interactions with the social-networking system 360. User-generated content may include anything a user can add, upload, send, or "post" to the social-networking system 360. As an example and not by way of limitation, a user communicates posts to the social-networking system 360 from a client system 330. Posts may include data such as status updates or other textual data, location information, photos, videos, links, music or other similar data or media. Content may also be added to the social-networking system 360 by a third-party through a "communication channel," such as a newsfeed or stream.

In particular embodiments, the social-networking system 360 may include a variety of servers, sub-systems, programs, modules, logs, and data stores. In particular embodiments, the social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 360 may also include suitable components such as network interfaces, security mechanisms, load balancers, failover servers, management-and-network-operations consoles, other suitable components, or any suitable combination thereof. In particular embodiments, the social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 360 to one or more client systems 330 or one or more third-party systems 370 via a network 310. The web server may include a mail server or other messaging functionality for receiving and routing messages between the social-networking system 360 and one or more client systems 330. An API-request server may allow a third-party system 370 to access information from the social-networking system 360 by calling one or more APIs. An action logger may be used to receive communications from a web server about a user's actions on or off the social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from a client system 330 responsive to a request received from a client system 330. Authorization servers may be used to enforce one or more privacy settings of the users of the social-networking system 360. A privacy setting of a user determines how particular information associated with a user can be shared. The authorization server may allow users to opt in to or opt out of having their actions logged by the social-networking system 360 or shared with other systems (e.g., a third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Figure 4:
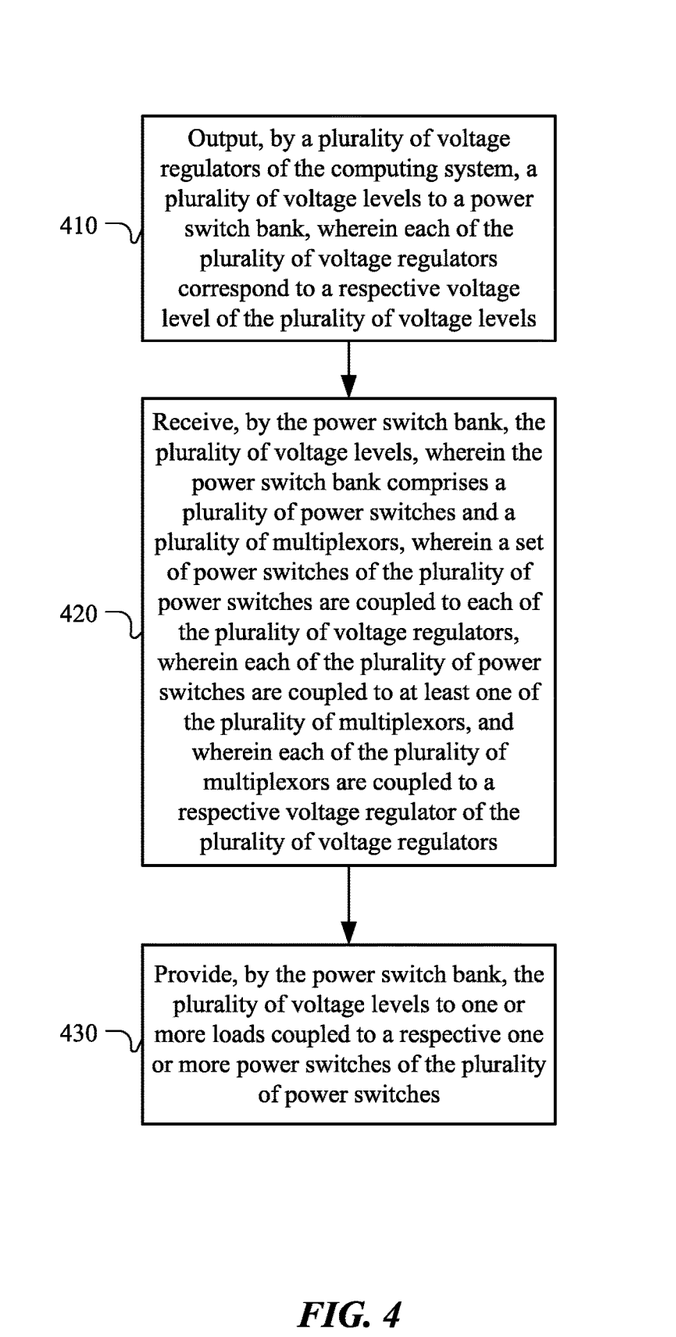
FIG. 4 illustrates an example method for voltage scaling.

FIG. 4 illustrates an example method 400 for voltage scaling. The method may begin at step 410, where a plurality of voltage regulators of a computing system (e.g., augmented reality system, virtual reality system, mixed reality system) may output a plurality of voltage levels to a power switch bank. In particular embodiments, each of the plurality of voltage regulators may correspond to a respective voltage level of the plurality of voltage levels. At step 420, the power switch bank of the computing system may receive the plurality of voltage levels. In particular embodiments, the power switch bank may comprise a plurality of power switches and a plurality of multiplexors. In particular embodiments, a set of power switches of the plurality of power switches may be coupled to each of the plurality of voltage regulators. In particular embodiments, each of the plurality of power switches may be coupled to at least one of the plurality of multiplexors. In particular embodiments, each of the plurality of multiplexors may be coupled to a respective voltage regulator of the plurality of voltage regulators. At step 430, the power switch bank may provide the plurality of voltage levels to one or more loads coupled to a respective one or more power switch of the plurality of power switches. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for voltage scaling, including the particular steps of the method of FIG. 4, this disclosure contemplates any suitable method of implementing a decomposed application, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
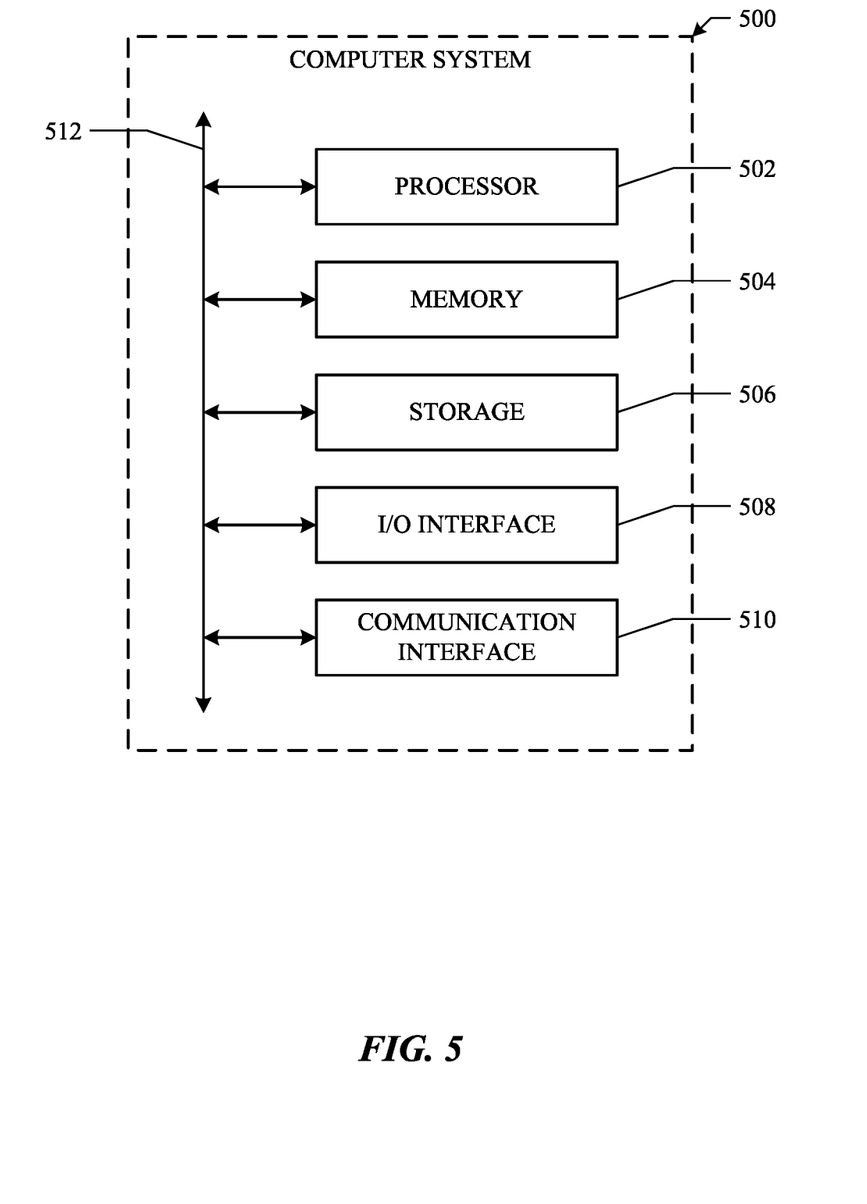
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
a plurality of voltage regulators configured to output a plurality of voltage levels, wherein each of the plurality of voltage regulators correspond to a respective voltage level of the plurality of voltage levels;
a power switch bank comprising a plurality of power switches and a plurality of multiplexors, wherein a set of power switches of the plurality of power switches are coupled to each of the plurality of voltage regulators, wherein each of the plurality of power switches is coupled to at least one of the plurality of multiplexors, and wherein each of the plurality of multiplexors are coupled to a respective voltage regulator of the plurality of voltage regulators; and one or more loads coupled to a respective one or more power switches of the plurality of power switches.

2. The system of claim 1, wherein the set of power switches are further configured to receive each of the plurality of voltage levels from the plurality of voltage regulators, and wherein an output of each voltage regulator corresponds to each power switch of the set of power switches.

3. The system of claim 2, wherein the set of power switches is configured to output a combination of the plurality of voltage levels to the one or more loads based on the one or more loads coupled to the set of power switches.

4. The system of claim 1, wherein another set of power switches of the plurality of power switches are coupled to each of the plurality of voltage regulators.

5. The system of claim 1, wherein each of the plurality of power switches are coupled to one of the plurality of voltage regulators.

6. The system of claim 1, wherein each of the plurality of multiplexors receives a first signal and a second signal from each of the plurality of power switches coupled to the respective multiplexor, wherein the first signal is indicative of whether the respective power switch is active, and wherein the second signal is indicative of a corresponding voltage level associated with the respective power switch.

7. The system of claim 1, wherein each of the plurality of multiplexors is configured to determine a lowest voltage level corresponding to the plurality of power switches coupled to the respective multiplexor, and wherein each of the plurality of multiplexors sends a lowest voltage level signal indicative of the lowest voltage level to the respective voltage regulator coupled to the respective multiplexor.

8. The system of claim 7, wherein each of the plurality of voltage regulators are configured to adjust one or more voltage levels of the plurality of voltage levels based on the lowest voltage level signal received from the respective multiplexor.

9. The system of claim 8, wherein one of the plurality of voltage regulators is configured to adjust one of the plurality of voltage levels higher if the lowest voltage level is below a threshold voltage level, and wherein the threshold voltage level is based on the one or more loads.

10. The system of claim 1, wherein the one or more loads comprises one or more of a dynamic voltage frequency scaling domain or a rail gate.

11. The system of claim 1, further comprising:
one or more bulk decoupling capacitors coupled between the plurality of voltage regulators and the power switch bank.

12. The system of claim 1, further comprising:
one or more small decoupling capacitors coupled between the power switch bank and the one or more loads.

13. The system of claim 1, further comprising:
one or more components configured to change one or more of the plurality of voltage levels.

14. The system of claim 1, wherein a size of each of the plurality of power switches is based on the one or more loads coupled to the respective power switch.

15. A method comprising, by a computing system:
outputting, by a plurality of voltage regulators of the computing system, a plurality of voltage levels to a power switch bank, wherein each of the plurality of voltage regulators correspond to a respective voltage level of the plurality of voltage levels;

receiving, by the power switch bank of the computing system, the plurality of voltage levels, wherein the power switch bank comprises a plurality of power switches and a plurality of multiplexors, wherein a set of power switches of the plurality of power switches are coupled to each of the plurality of voltage regulators, wherein each of the plurality of power switches are coupled to at least one of the plurality of multiplexors, and wherein each of the plurality of multiplexors are coupled to a respective voltage regulator of the plurality of voltage regulators; and providing, by the power switch bank, the plurality of voltage levels to one or more loads coupled to a respective one or more power switches of the plurality of power switches.

16. The method of claim 15, further comprising:
receiving, by the set of power switches, each of the plurality of voltage levels from the plurality of voltage regulators, and wherein an output of each voltage regulator corresponds to each power switch of the set of power switches.

17. The method of claim 16, further comprising:
outputting, by the set of power switches, a combination of the plurality of voltage levels to the one or more loads based on the one or more loads coupled to the set of power switches.

18. The method of claim 15, wherein another set of power switches of the plurality of power switches are coupled to each of the plurality of voltage regulators.

19. The method of claim 15, wherein each of the plurality of power switches are coupled to one of the plurality of voltage regulators.

20. The method of claim 15, further comprising:
receiving, by each of the plurality of multiplexors, a first signal and a second signal from each of the plurality of power switches coupled to the respective multiplexor, wherein the first signal is indicative of whether the respective power switch is active, and wherein the second signal is indicative of a corresponding voltage level associated with the respective power switch.

* * * * *